INVENTOR.
ERIC WINSTON
BY
Hopgood & Calimafde
ATTORNEYS

April 22, 1969  E. WINSTON  3,440,329
COUPLER HOUSING WITH INTEGRAL CABLE RECEPTACLES
Filed March 2, 1967  Sheet 2 of 2

INVENTOR.
ERIC WINSTON
BY
Hopgood & Calimafde
ATTORNEY

United States Patent Office 3,440,329
Patented Apr. 22, 1969

3,440,329
COUPLER HOUSING WITH INTEGRAL CABLE RECEPTACLES
Eric Winston, Melrose Park, Pa., assignor to Jerrold Electronics Corporation, Hatboro, Pa., a corporation of Delaware
Filed Mar. 2, 1967, Ser. No. 620,118
Int. Cl. H05k 5/00
U.S. Cl. 174—52                                  5 Claims

ABSTRACT OF THE DISCLOSURE

A compact coupler housing containing circuitry for the distribution of CATV signals. The cable attachments are an integral part of the housing. Cooperating access ports permit attachment of signal and subscriber cables and circuit testing, without disassembly of the basic housing.

---

This invention provides, in a unique package, the hardware and circuitry required for receiving and distributing an electrical signal.

Community antenna television systems require distribution networks to take the electrical signal from the master cable and to distribute it to subscribers. Couplers for this purpose require connections to the master signal cable and the cables leading to subscriber stations, and circuitry for proper signal distribution. The installation of such couplers ordinarily involves the cutting and stripping of the master and subscriber cables for making the connections.

In accordance with the prior techniques, the installation of equipment housings having the seized center conductor feature required that the housing be disassembled, exposing its elements to the prevailing weather, and requiring substantial time and effort on the part of the technicians to cut, strip, and make the necessary connections. Circumstances at times require the installation of these couplers where there is limited space and access, making small size and simplicity of installation and servicing highly desirable.

This invention provides an improved coupler which includes cable receptacles and distribution circuitry in a compact and uniquely shaped housing which permits installation and testing without the necessity of removing the housing cover.

Accordingly, it is an object of this invention to provide a coupler housing which embodies the above improvements.

Another object of the invention is to provide a compact coupler housing of rugged waterproof construction with versatile mounting means.

A further object of the invention is to provide a coupler housing to which all connections can be made without disassembly.

A further object of the invention is to facilitate the installation of the coupler by providing integral means for securely gripping the sheathing of the master coaxial cable, thereby providing a superior ground connection, and automatically producing a watertight junction when the installation is complete.

A still further object of the invention is to provide built-in feeder-line cable connectors with high isolation between outlets.

A still further object of the invention is to provide means for ready access to the distribution circuitry for test purposes, without the necessity of disassembly.

The above-mentioned and other features of this invention will become more apparent and the invention itself will best be understood by reference to the following description of embodiments of the invention taken in conjunction with the accompanying drawing, wherein.

Figure 1:
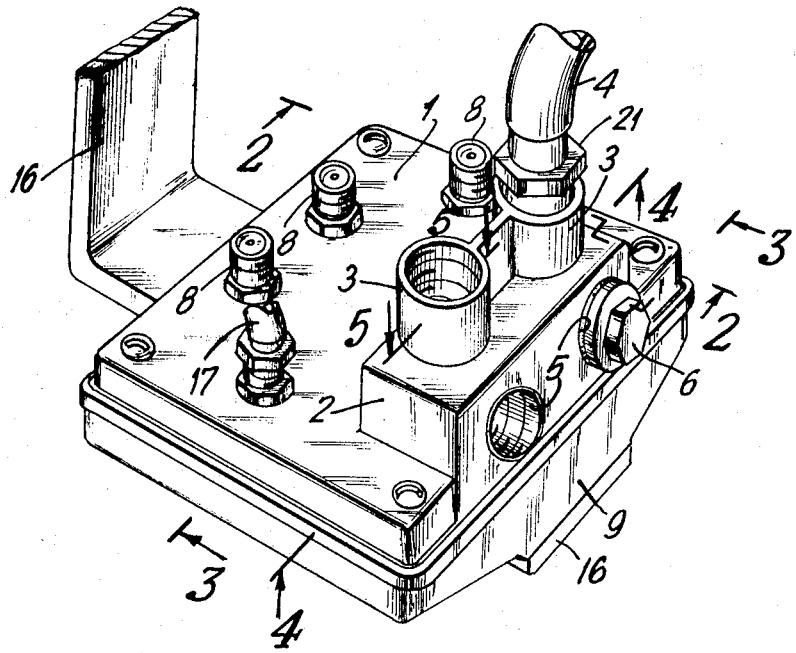
FIG. 1 is a perspective view of the bottom of the housing with the several cable receptacles and access ports necessary to effect installation, and the mounting bracket.
Figure 2:
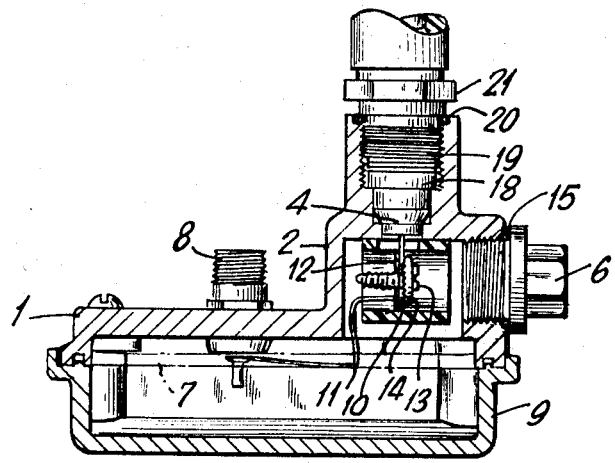
FIG. 2 is a cut-away side view (section taken along line 2—2 of FIG. 1) of the coupler housing showing the elements of the signal cable connector in detail and illustrating the relationship between the various connections, the circuit board and the housing.

A preferred embodiment of the invention is illustrated in the drawings. Referring to FIGS. 1 and 2, the housing shell, preferably of cast aluminum, is formed by a base plate 1 and a cover 9. Base plate 1 extends to form rectangular section 2 from which protrude two tubular cable receptacles 3. The master cable 4 is secured to the housing within the tubular receptacle 3, its center conductor extending on into rectangular section 2 where means for connecting it to the distribution circuitry are housed. Two access ports 5 to the rectangular section 2 permit access to the means for connecting the center wire of the master cable to the distribution circuitry with the housing otherwise closed. Two watertight cover plugs 6 cover these access ports. Four subscriber cable taps 8, to which subscriber cables 17 are connected, are attached and sealed to the base plate 1.

In FIG. 2 the circuit board 7 is seen mounted to the base plate 1, the circuitry thereon arranged about the cable contacts so as to provide optimum performance and occupy a minimum of space. The contents are enclosed by cover plate 9 which is sealed to the base 1. The circuit board lies in contact with the subscriber taps 8 but is connected to the master cable by contacts 12 and lead wires 11. In this configuration, the circuit board and master cable contact means may be removed as a unit from the enclosure; further facilitating replacement and repair.

Figure 3:
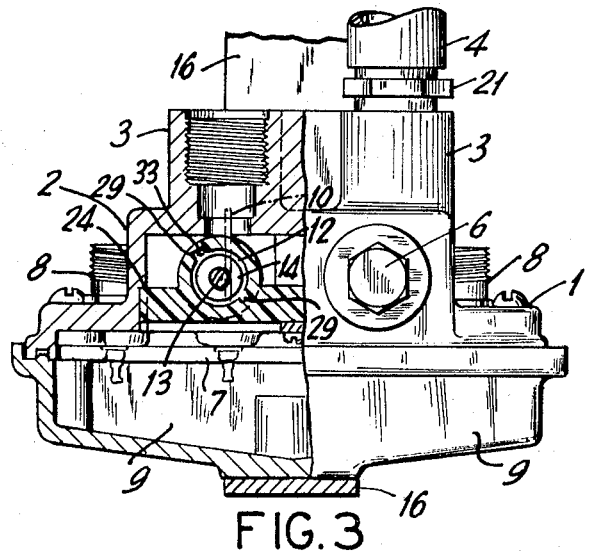
FIG. 3 is a partial sectional view taken along line 3—3 of FIG. 1 showing the interior of one access port and the connection means therein for connecting the master cable conductor to the housing.

With the housing so assembled, installation of the invention proceeds as follows: the master signal cable 4, with about one-half inch of its center wire extended as illustrated in FIGS. 2 and 3, is inserted into one of the tubular receptacles 3 where it is held in place by concentric locking collars 18 and 19 and annular locking sleeve 21. The locking collar arrangement is claimed in my copending patent application, entitled, "Multi-Ferrule Cable Connector," Ser. No. 608,915, filed Jan. 12, 1967. The connection is made watertight by a ring-type seal 20 which is compressed against the housing when the clamp nut 21 is seated. With the cable thus inserted, the center wire 10 is positioned across an electrical contact plate 12, and locked thereto by a serrated washer 14 located under the head of screw 13. The positive locking contact between the center conductor and the distribution circuitry is important because of the relatively high current carried by the master cable. Plug 6 is then inserted to seal the interior of the housing against water and other contaminants.

Figure 4:
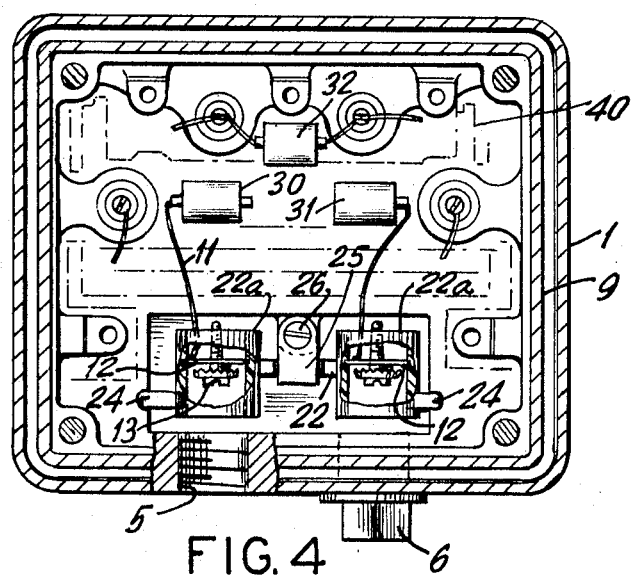
FIG. 4 is a top view of the housing with the cover plate removed illustrating the general relationship of the circuit board components, subscriber cable connectors, and the master cable connectors.
Figure 5:
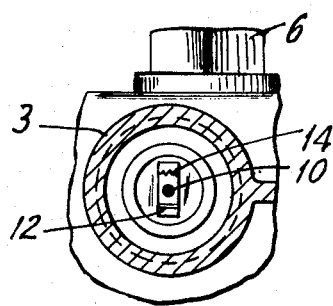
FIG. 5 is a view taken along line 5—5 of FIG. 1 looking inside a master cable receptacle.

As illustrated in FIG. 4, contact plates 12 are supported within the base 1 by a unitary structure 22—22a. This unitary structure is comprised of two cylinders 22a which house the contact plates 12, and a supporting cross bridge 22. The edges of the bridge 22 fit into slots 24 provided within rectangular section 2. This unitary strucure is held in place by plate 5 which fits over the center of the bridge section 22 between the cylinders 22a and is held there by screw 26.

The contact plates 12 are generally circular, with two tabs 29 extending from opposite sides which fit into keyways provided in cylinders 22a. The center of each plate is threaded to receive a retaining screw 13. One of the tabs 29 is connected to a lead-in wire 11 at point 33 which connects it to the distribution circuitry. The distribution circuitry 40 on board 7 is printed, and the components 30, 31, 32, illustrated in block form, are preferably transistorized to conserve space. The combination is designed to occupy minimum area consistent with required tap separation and proper performance.

The housing is supported by a bracket 16 attached to the cover plate 9 utilizing the holes provided for this purpose (see FIG. 1). The preferred mounting position being with all cable junctions extending downward, giving the complete installation an octopus-like appearance. The protruding portions of subscriber taps 8 conform to the threaded male portions of common coaxial cable junctions onto which female fixtures retaining the subscriber cable 17 may be threaded. The taps 8 are sealed internally so that water cannot pass through and into the housing 1.

From the foregoing description, it will be apparent that this invention provides an improved coupler housing, of compact, rugged construction, which facilitates installation and mounting, and protects the distribution circuitry and connections from adverse weather.

While the principles of the invention have been described in connection with the above specific apparatus, it is to be clearly understood that this description is made only by way of example and not as a limitation to the scope of the invention as set forth in the accompanying claims.

What is claimed is:
1. An electrical signal distribution module for distributing electrical signals supplied by a main cable to a plurality of subscriber cables, comprising:
   a housing including a base and a cover, a plurality of cable receptacle means integral said housing base and opening downwardly therefrom to receive an input and an output end of a main signal carrying cable;
   a plurality of subscriber cable taps mounted on said base and extending downwardly therefrom to receive mating connectors attached to subscriber cables;
   terminal means attached to said base to seize center conductors extending from said input and output ends of said main signal carrying cable, and signal distribution circuit means to connect said terminal means to said subscriber cable taps to distribute the signals from said main cable to said subscriber cables.

2. The device of claim 1, wherein said means to seize the center conductors extending from said input and output ends of said main signal carrying cable comprises:
   a plurality of electrical contact plates connected to said signal distribution circuitry and positioned adjacent the center conductors of said input and output ends of said main cable when inserted into said receptacles;
   insulating means to support said contact plates in position adjacent the center conductors;
   means to engage each of said center conductors and press them against said contact plates, including a member having teeth which bite into said center conductor; and
   means threading into said contact plates to draw said toothed member thereto.

3. The device of claim 2, wherein said signal distribution circuit means comprises a circuit board having substantially the same area as said base, and is mounted thereon; and wherein said base has a recess therein, said terminal means being mounted within said recess so as to overlap said circuit board; and wherein said integral cable receptacles communicate with said recess.

4. The device of claim 3, wherein said base has pluggable access ports therein which communicate with said recess and provide direct access to said terminal means so that all connections to the module can be made without removing the cover therefrom.

5. The device of claim 4, further including a mounting bracket secured to the cover of said housing, said bracket being shaped to support said housing in an elevated position so that said input, output and subscribed cables all extend downwardly therefrom.

References Cited

UNITED STATES PATENTS 2,447,749   8/1948   Hallett.

LEWIS H. MYERS, *Primary Examiner.*

D. A. TONE, *Assistant Examiner.*